United States Patent [19]

Tumiatti et al.

[11] Patent Number: 4,839,042
[45] Date of Patent: Jun. 13, 1989

[54] IMMOBILIZED REAGENT FOR THE DECONTAMINATION OF HALOGENATED ORGANIC COMPOUNDS

[75] Inventors: Wander Tumiatti; Gilberto Nobile; Pietro Tundo, all of Torino, Itlay

[73] Assignee: Sea Marconi Technologies S.p.A., Turin, Italy

[21] Appl. No.: 916,533

[22] Filed: Oct. 8, 1986

Related U.S. Application Data

[63] Continuation-in-part of Ser. No. 632,718, Jul. 20, 1984, abandoned.

[30] Foreign Application Priority Data

Jul. 22, 1983 [IT] Italy .................... 22215 A/83

[51] Int. Cl.⁴ .............. B01D 27/02; A62D 3/00; B01J 20/26; B01J 27/02
[52] U.S. Cl. .................. 210/194; 210/679; 210/282; 210/909; 208/262.5; 502/402
[58] Field of Search .......... 502/402, 401, 404, 159, 502/171; 210/679, 263, 282, 502.1, 506–509, 909, 194; 208/262

[56] References Cited

U.S. PATENT DOCUMENTS

| | | | |
|---|---|---|---|
| 2,481,300 | 9/1949 | Engel | 208/262 |
| 3,983,053 | 9/1976 | Courtney et al. | 210/679 |
| 4,276,179 | 6/1981 | Soehngen | 210/909 |
| 4,327,027 | 4/1982 | Howard et al. | 568/755 |
| 4,430,208 | 2/1984 | Pytlewski et al. | 210/909 |
| 4,477,354 | 10/1984 | Fessler | 210/909 |
| 4,526,677 | 7/1985 | Grantham et al. | 210/909 |
| 4,632,742 | 12/1986 | Tundo | 204/158.21 |

FOREIGN PATENT DOCUMENTS

| | | | |
|---|---|---|---|
| 0118858 | 9/1984 | European Pat. Off. | 208/262 |
| 0135043 | 3/1985 | European Pat. Off. | 502/402 |

*Primary Examiner*—Paul E. Konopka
*Attorney, Agent, or Firm*—Bucknam and Archer

[57] ABSTRACT

An immobilized reagent for the decontamination of fluids is described, consisting of a solid, carrier on which there are absorbed (a) polyethylene glycols, (b) alkali or alkaline-earth metal alcoholates.

6 Claims, 1 Drawing Sheet

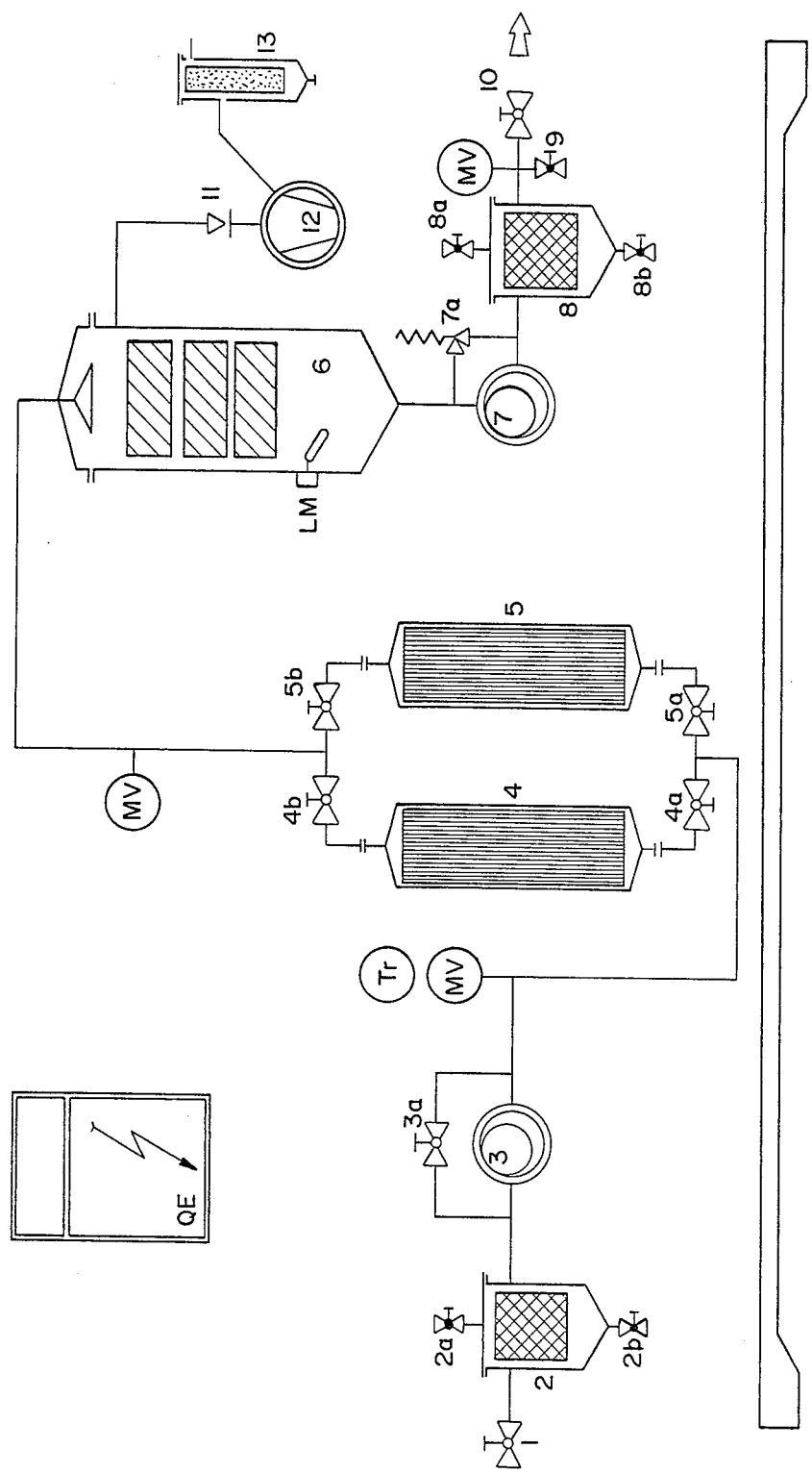

IMMOBILIZED REAGENT FOR THE DECONTAMINATION OF HALOGENATED ORGANIC COMPOUNDS

This application is a continuation-in-part of U.S. Ser. No. 632,718, filed July 20, 1984, now abandoned.

The invention relates to an immobilized reagent for use in the decontamination of industrial oils contaminated by polyhalogenated organic compounds.

The immobilized reagent of the invention may be used in devices such as cartridges, columns and the like through which the fluid to be decontaminated is eluted.

A primary field of application of the invention is in processing and decontaminating dielectric fluids that are utilized in electrical apparatus such as high, mean and low voltage condensers or transformers.

Processing dielectric fluids in accordance with the invention permits decontamination of the fluids to be carried out in a continuous manner without requiring interruptions in operation of the electrical apparatus containing the fluid to be processed, while, at the same time, both the dielectric and the chemico-physical properties of the fluid are significantly improved. Decontamination will take place at either room temperature or the working temperature of the apparatus to be decontaminated, which obviously results in the advantage that the process is easy and economical to carry out as compared with conventional vacuum treatments.

The immobilized reagent of the invention allows an effective decontamination of fluids contaminated with polychlorobiphenyls (PCB), dioxins, DDT, polychlorobenzofurans, TCB, etc.

U.S. Pat. Nos. 4,477,354 and 4,526,677 disclose methods for the destruction of PCBs based on physical processes such as distillation, extraction and/or selective adsorption. Said methods require therefore cumbersome procedures and apparatuses. Several methods for the decontamination of polyhalogenated organic compounds based on chemical reactions are also known: U.S. Pat. No. 4,327,027 discloses a method comprising the reaction of the fluid to be decontaminated with alkali metal alcoholates at temperatures ranging from 140° to 220° C.; U.S. Pat. No. 4,400,552 teaches a decomposition reagent consisting of an alkali metal hydroxide, a polyglycol or a polyglycol monoalkyl ether and oxygen while in U.S. Pat. No. 4,337,368 a similar reagent is substituted by an alkali metal such as sodium. Finally, EP-A-No. 118858 in the applicant's name and corresponding to U.S. application Ser. No. 711,404 filed on Mar. 13, 1985, discloses a reagent for the decontamination of halogenated compounds consisting of (a) a polyethylene glycol, a polyhydroxy compound or a random copolymer of ethylene and propylene oxides, (b) a base and (c) an oxidizing agent or a source of radicals. Said methods are effective for the batch decomposition of contaminated fluids or materials to be carried out in reaction vessels and the latter is also suitable for the "in situ" decontamination of soil and polluted surfaces.

None of said methods and reagents is however applicable to the treatment of industrial oils by a continuous process.

The present invention provides an immobilized, decontaminating reagent consisting of a carrier from the group consisting of alkali and alkaline-earth metal carbonates and bicarbonates upon which there are absorbed (a) polyethylene glycols of the formula

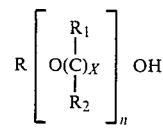

wherein
X is $\geq 2$ and n is an integer of 2 to 400; R may be hydrogen, a straight or branched-chain $C_1-C_{20}$ alkyl group, an aralkyl or acyl group;
$R_1$ and $R_2$, which may be the same or different from one another, represent hydrogen, straight or branched-chain alkyl group, possibly substituted $C_5-C_8$ cycloalkyl or aryl group;
or, alternatively, random copolymers of various alkene oxides in different proportions and, for example, of ethylene oxide and propylene oxide (Nixolen$^R$); and (b) alkali or alkaline earth metal $C_1-C_6$ alcoholates.

The reagent may also comprise a radical source or organic or inorganic peroxides.

The carrier is selected in the group consisting of alkaline-earth metal carbonates or bicarbonates or alkali metal carbonates or bicarbonates, such as sodium or potassium carbonate or bicarbonate, silica or alumina. Sodium or potassium carbonate are particularly preferred.

The component (a) is preferably an high molecular weight polyethyleneglycol or an high viscosity random copolymer of ethylene and propylene oxide while the component (b) is preferably sodium methoxide or potassium tert-butylate.

The optional source of radicals or oxidizing agent may be sodium peroxide, sodium perborate or similar peroxides or persalts.

Quantities in weight percent of the reactive bed components generally range from 40% to 90% for the solid carrier, from 2.5% to 25% for the polyethylene glycol or random copolymer (Carbowax ®, NIXOLEN ®, etc.), from 0.5% to 15% for alcoholate (potassium tert-butylate, etc.), from 0% to 5% for the oxidizing agent (sodium peroxide, sodium perborate, etc.).

The reagent particle size will preferably range from 180 to 4000 μm.

A schematic diagram of a plant according to the invention is shown in FIG. 1.

The figure is a schematic view of an exemplificative embodiment of a plant including a device according to the invention, comprising an inlet valve 1 for the oil to be decontaminated; a mechanical filter 2 upstream of the inlet of pump 3 which is provided with a by-pass; columns 4 and 5 containing the solid reagent for the dehalogenation reaction; degassing tower 6 under vacuum; outlet oil pump 7; a mechanical filter 8 for the decontaminated oil; sampling valve 9; outlet valve 10 for the decontaminated oil; an high or low ($-20°/-45°$ C. temperature condenser; a vacuum generator 12 and a filter 13 protecting the gas outlet of the vacuum generator.

To achieve an effective decontamination of the fluid containing polyhalogenated compounds, the immobilized reagent is charged into appropriate receptacles (cartridges, columns, etc.) and the fluid to be decontaminated is made to pass through it. The treatment may comprise a single run or several repeated runs through the immobilized reagent, according to the operating conditions and the application concerned. The continuous cyclic process may be automatized so as to be, for example, discontinued when analysis of the treated oil indicates that the minimum preset decontamination threshold is exceeded. Thus, these cartridge devices provided with the solid decontaminating bed can be conveniently used in conjunction with dielectric contaminating fluid-containing apparatus, such as transformers or condensers, to treat said fluid even during the operation of the apparatus itself. It has been found that components (a) and (b) are not eluted from the carrier by the fluid and that the reaction products of the PCBs with the reagent are fixedly retained on the solid bed and, thus, they do not merely replace the PCBs in the mineral oil but are removed therefrom. The dehalogenated products are normally adsorbed and retained on the reactive bed.

During the reaction, in addition to chemically destroying the polyhalogenated compounds, the decontaminating bed also operates to achieve a dehumidification, a deacidification, a capture of the suspended particles, an improvement in aspect of the fluid, which results in improving its dielectric characteristics. Thus, by applying the continuous closed circulation process, the column may consist of a cartridge which, when placed in closed and/or open cycle to a running transformer, is effective for recycling the dielectric fluid thereof, continuously decontaminating it and improving its characteristics. Such an apparatus may be left in a mounted state until PCB contents will drop below the limits prescribed by law.

The dehalogenation rate that is obtainable by the use of the reactive bed according to the invention is high even at room temperature and it increases with the halogenation level of the substrate; thus, for example, firstly the most chlorinated and, therefore, most toxic polychlorobiphenyls will be degraded. During the reaction, the initially white bed gradually turns to dark-black: the reaction products are, in fact, retained on the bed to be then further oxidized. The exhausted bed is, however, not dangerous since the aromatic polyhalogenated compounds have been transformed completely to the analogous phenols, polyphenols, phenol ethers and/or the corresponding hydrocarbons with production of the alkali metal or alkaline-earth metal halide. The starting reactive bed itself consists of nontoxic, low cost substances.

The preparation of the immobilized reagent is carried out by adding the solid carrier to the other components in the absence of solvents and possibly under vacuum, at a temperature at which the polymeric components are melt, or to solutions of said components in an alcohol having at least 4 carbon atoms and then removing the solvent by evaporation.

Different methods may be used to achieve the preferred particle-size, for instance the polyethylene glycol or an alkene oxide copolymer is stirred with the base and the oxidizing reagent. The chemicals are mixed and the mixture is heated until the melting point of the polymers. The carrier is then added, under stirring, to the melted mixture, cooling at the same time to room temperature.

During this step the correct granulation of the reagent is obtained. At the end, a small quantity (2–8%) of glass or plastic spheres (with a diameter of 1–5 mm) may be added before filling the cartridge or column.

This method gives a gradation of the granules from 180 μm (micrometer) to 4,000 μm (micrometer) with approximatively the following percent distribution:

| | |
|---|---|
| 4,000 μm | 1.3% |
| 2,000–4,000 μm | 6.8% |
| 1,000–2,000 μm | 10.0% |
| 850–1,000 μm | 4.5% |
| 500–850 μm | 30.0% |
| 300–500 μm | 27.0% |
| 180–300 μm | 14.0% |
| 180 μm | 6.4%. |

Alternatively, the solid carrier is impregnated by the solution of the reagent in a suitable solvent (30–50%).

The solvent is then removed by evaporation under vacuum, stirring vigorously the mixture to avoid the agglomeration.

This method allows also the impregnation with the reagent of porous supports as spheres or Raschig rings made with alumina, carborundum and having dimensions of 3–6 mm of diameter.

An hot extrusion process may also be used. In this case, a suitable apparatus is used in order to obtain:
the blending of different chemicals composing the reagent
the melting of the blended mixture
the extrusion.

The chemicals composing the reagent (polymer, base, oxidant+carbonate, bicarbonate or alumina in powder) are introduced in the extruding machine and blended, melted (until the melting point of the "polymers") and extruded.

The extruded material may have different sections with a size range of 0.5–2 mm diameter and 1–3 mm length.

A particle size distribution similar to that obtained by the above described methods may also be obtained by the granulation in oil procedure:

The chemicals composing the reagent are introduced in a reactor with a water jacket. The chemicals are mixed and heated to the melting point of the polyethylene glycol or alkene oxides polymer.

At the same temperature, mineral oil or a suitable synthetic oil is added, at a reagent/oil ratio 1:1.5 or 1:2, and stirred vigorously to reach the formation of melted reagent spheres in oil with 0.2–2 mm of diameter.

Cooling of the mixture, always under stirring, allows the solidification of the melted spheres. The solid spheres can directly be used to fill columns cartridges or similar devices.

Devices that are suitable for containing the reactive beds of the invention may be of any appropriate form and size according to the particular application concerned, and they will be made from a material that is inert towards the components of the reagent to be contained therein, such as, for example, a stainless steel.

Particularly preferred is the use of a conventional type cartridge provided with outlet, inlet and vent pipes wherein the fluid is subjected to a radially outwardly flow. The cartridge, partially filled with the reagent of the invention, may also comprise a region of paper filter adjacent to the zone containing the reagent.

Filling and packing of said devices with the reactive beds are performed according to conventional methods.

The following non restrictive examples, further describe the invention and the results that are achieved thereby.

In these examples, a reactive bed has been charged to a treating column and used for effecting chemical destruction of the considered contaminant in two different ways:

1. Oil to be decontaminated was supplied by means of a pump to the column and the effluent oil from this was sent back into the same receptacle in which it was contained initially; a continous circulation of the oil over the same bed was thus effected and maintained until a gas-chromatography analysis indicated that the pollutant content had been brought down to the desired level. The time required for this result to be obtained will obviously depend upon both the dehalogenating ability (as related to the quantity of treated fluid) of the bed, and the reaction temperature (which may also be the room temperature).

2. The contaminated oil is supplied by means of a pump to the column in a continuous manner and is collected in a receptacle other than the one used at the start of the cycle; introduction of oil into the column is stopped when gas-chromatography analysis of all of the collected fluid shows that the contaminant preset threshold is about to be attained; optimization of the process is obtained, once the contaminant content of the fluid and the dehalogenating capacity of the bed are known, by correspondingly setting the operating temperature and the flow rate of liquid through the bed (lower flow rate giving best results).

EXAMPLE 1

Preparation of the reactive bed 20.0 g of Carbowax 6000 (PEG at $\overline{PM}=6000$) and 5.0 g potassium tert-butylate were dissolved in 200 ml of tert-butyl alcohol. 5.0 g $Na_2O_2$ and 200 g of anhydrous $K_2CO_3$ were then added to this solution. Then, the solvent was removed by evaporation at reduced pressure firstly by means of a water pump and thereafter by the aid of an oil pump.

EXAMPLE 2

Chemical destruction of PCBs contained in an oil used in high and mean voltage, electric power-transformers (continuous closed process for application directly in situ)

100 ml of a mineral oil (Isovoltine ®) contaminated with 100 ppm PCBs (Ascarel) was supplied to a column (1=40 cm, $\phi$=1.5 cm) thermostated at 60° C. and containing 30 g of a reactive bed prepared as in Example 1, at a flow rate of 120 ml/h. The effluent oil from the column was returned to the starting vessel contents of which were maintained under magnetic stirring. Periodic analysis by gas-chromatography of the PCBs content of the oil in the vessel showed that the concentration thereof was dropped to 350 ppm after two hours and to 46 ppm after 12 hours.

EXAMPLE 3

Chemical destruction of PCBs contained in an oil used in high and mean voltage electric power-transformers (continuous open process)

Mineral oil (Isovoltine ®) containing 1000 ppm of PCBs (Ascarel) was supplied to a column (1=40 cm, $\phi$=1.5 cm) containing 30 g of reactive bed prepared as in Example 1, by the aid of a pump. When operating at 60° C. and 120 ml/h flow rate, the first 150 ml of oil collected at the column outlet showed a PCBs concentration of 550 ppm, while operation at 90° C. and 60 ml/h flow rate gave a PCBs concentration of 38 ppm (as shown by gas-chromatography) in the first 150 ml of collected oil.

$^1$H-NMR analysis of this decontaminated oil showed a hardly noticeable PEG content (<1%).

After rejection of these first 150 ml, the oil flow rate through the column was maintained until difference in PCBs content between the oil entering the column and the oil flowing out (about 500 ml) thereof was no longer observed. Then, the exhausted bed was removed from the column, dissolved in 500 ml water and, following to acidification with nitric acid, it was analized potentiometrically as to its $Cl^-$ content using an $Ag/Ag^+$ electrode, by titration with $Ag^+$ 0.1 N. 1.02 mmoles of $Cl^-$ was found, which, as compared with the used PCBs (about 50 percent by weight of Cl), corresponds to the decomposed PCBs fraction, assuming that all of the aromatic Cl atoms should have reacted.

EXAMPLE 4

Comparing different types of reactive beds

Different types of reactive beds were tested by operating under the same processing conditions as in Example 3, at 90° C. and 60 ml/h flow rate, with analysis only effected on the first 150 ml of oil collected at the column outlet. The following are some of the results that were obtained:

A. A bed was prepared as in Example 1 but with no $Na_2O_2$ contained therein. PCBs concentration: 350 ppm.

B. A bed was prepared as in Example 1 but with $Na_2O_2$ being added in a finely divided form following removal of solvent by evaporation. PCBs concentration: 500 ppm.

C. A bed was prepared as in Example 1 but with use of tetrahydrofuran, in lieu of tert-butyl alcohol, as the solvent. PCBs concentration: 700 ppm.

D. A bed was prepared as in Example 1 but with no potassium tert-butylate being contained therein. PCBs concentration: 380 ppm.

E. A bed was prepared as in Example 1 but without using Carbowax 6000. No reaction was observed.

F. A bed was prepared as in Example 1 but without $Na_2O_2$ added, using methyl alcohol instead of the tert-butyl alcohol, and potassium hydroxide (2.6 g) in lieu of the potassium tert-butylate. PCBs concentration: 770 ppm.

G. A bed was prepared as in Example 1, but with Nixolen VS 2600 ($\overline{PM}=5400$) being used in lieu of the Carbowax 6000. PCBs concentration: 42 ppm.

H. A bed comprising 12.5% of $CH_3ONa$ and 25% of Carbowax 6000 on $K_2CO_3$ was prepared in the absence of a solvent, under vacuum. PCBs concentration: 110 ppm.

EXAMPLE 5

440 Kg of mineral oil containing 4000 ppm of PCBs was treated in continuous through a cartridge filled with a reagent comprising 1.60 kg of polyethylenglycol 6000, 1.60 kg of sodium methoxide dispersed on 12.5 kg of potassium carbonate and 0.40 kg of polystyrene as a binder, at the temperature of 80° C.

The results of the analysis carried out before and after decontamination are hereinbelow reported.

| BEFORE THE DECONTAMINATION PROCESS | |
| --- | --- |
| PCB concentration | 4000 ppm |
| PCB weight (calculated) | 1.76 kg |
| Acidity | 0.06 mg KOH/g |
| Dissipation factor | 1.24 |
| Color | 3.0 |
| Water | 84 ppm |
| Dielectric breakdown | 40 kV |
| Sodium concentration | <1 ppm |

| AFTER DECONTAMINATION | |
| --- | --- |
| PCB concentration | 42 ppm |
| PCB weight (calculated) | 18.48 g |
| Acidity | <0.03 mg KOH/g |
| Dissipation factor | 0.18 |
| Color | 2.0 |
| Water | 27 ppm |
| Dielectric Breakdown | >60 kV |
| Sodium concentration | <1 ppm |

For the test completation were needed five cartridges to reduce the PCB concentration from 4000 ppm to 42 ppm, corresponding to 80 kg of solid bed.

| | |
| --- | --- |
| PCB decontaminated | 1.7 kg (3958 ppm) |
| Solid bed used | 80 kg |
| Number of cartridges | 5 |
| Yield (decontam.) | 348.00 g PCB/Cartridge |
| Yield (decontam.) | 21.75 g PCB/Solid bed |
| Total nr. of cycles | (1):125 |

(1) Cycle: time necessary to flow through the column 440 kg of mineral oil at 100 l/h:

No. by-products are detectable in IR and NMR spectra.

We claim:

1. A device for use in the decontamination of a fluid containing halogenated organic compounds consisting of at least one column or cartridge, said column or cartridge containing an immobilized reagent which consists essentially of 40–90% of a solid, carrier from the group consisting of alkali and alkaline-earth metal carbonates and bicarbonates, said carrier having absorbed thereon 2.5–25% of component (a) which is (1) a polyethylene glycol of formula

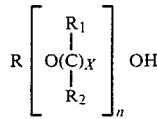

wherein X is >2 and n is an integer of 2 to 400: R is hydrogen, a straight or branched-chain $C_1$–$C_{20}$ alkyl, aralkyl or acyl; $R_1$ and $R_2$ are the same or different and are hydrogen, straight or branched-chain alkyl, unsubstituted or substituted by $C_5$–$C_8$ cycloalkyl or aryl; or (2) a random copolymer of alkene oxides in different proportions; and (b) 0.5–15% of an alkali or alkaline earth metal $C_1$–$C_6$ alcoholate, an inlet for said fluid, a sampling valve and an outlet for said fluid.

2. The device according to claim 1 wherein component (a) is a random copolymer of ethylene and propylene oxide.

3. The device according to claim 1 wherein the alcoholate is sodium methoxide or potassium tert-butylate.

4. The device according to claim 1 wherein said reagent has size ranging from 180 to 4000 micrometers.

5. The device according to claim 1 which comprises means for recirculating the fluid.

6. A device for use in the decontamination of a fluid containing halogenated organic compounds consisting of at least one column or cartridge, said column or cartridge containing an immobilized reagent which consists essentially of 40–90% of a solid, carrier from the group consisting of alkali and alkaline-earth metal carbonates and bicarbonates, said carrier having absorbed thereon 2.5–25% of component (a) which is:

(1) a polyethylene glycol of formula

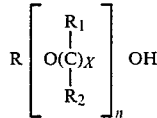

wherein X is >2 and n is an integer of 2 to 400; R is hydrogen, a straight or branched-chain $C_1$–$C_{20}$ alkyl, aralkyl or acyl; $R_1$ and $R_2$ are the same or different and are hydrogen, straight or branched-chain alkyl, unsubstituted or substituted by $C_5$–$C_8$ cycloalkyl or aryl; or (2) a random copolymer of alkene oxides in different proportions; (b) 0.15–15% of an alkali or alkaline earth metal $C_1$–$C_6$ alcoholate; and (c) as a source of radicals or as an oxidizing agent, a peroxide or a persalt in the amount up to 5% of said reagent, an inlet for said fluid, a sampling valve and an outlet for said fluid.

* * * * *